Sept. 28, 1954 P. H. BOUCHERON, JR 2,690,472

SYSTEM FOR PHOTOGRAPHICALLY RECORDING TELEVISION PROGRAMS

Filed Dec. 21, 1950 4 Sheets-Sheet 1

INVENTOR
Pierre H. Boucheron, Jr.
ATTORNEY

INVENTOR
Pierre H. Boucheron, Jr.
BY
[signature]
ATTORNEY

SYSTEM FOR PHOTOGRAPHICALLY RECORDING TELEVISION PROGRAMS

Filed Dec. 21, 1950 4 Sheets-Sheet 3

INVENTOR
Pierre H. Boucheron, Jr.
BY
ATTORNEY

INVENTOR
Pierre H. Boucheron, Jr.
BY [signature]
ATTORNEY

Patented Sept. 28, 1954 2,690,472

UNITED STATES PATENT OFFICE 2,690,472

SYSTEM FOR PHOTOGRAPHICALLY RECORDING TELEVISION PROGRAMS

Pierre H. Boucheron, Jr., Roslyn Heights, N. Y., assignor to Radio Corporation of America, a corporation of Delaware Application December 21, 1950, Serial No. 202,051

The terminal 15 years of the term of the patent to be granted has been disclaimed 6 Claims. (Cl. 178—5.8)

This invention relates to a system for making a photographic record of a television program. In particular, it relates to a type of system wherein the photographic recording is made directly from the scene to be televised.

In operating a television station, it is often necessary to obtain a photographic recording of a program in order that reprints may be made and distributed to other stations which cannot for one reason or another carry the live program. The most widely used method of making photographic recordings of a television program is known as kinescope recording wherein the photographic camera actually takes a picture of the images reproduced on a monitoring kinescope. When the recordings made in this way are used for transmission purposes, however, the quality of the images reproduced on television receivers indicates possible grounds for improvement at the present state of the art. However, no noticeable degradation of the image is present when films are used which are direct recordings of the program. Therefore, better rendering may be made if a photographic camera is mounted beside a television pick-up tube in each of the studio cameras so that they can make direct recordings of the scenes as they appear at the pick-up tube.

The broad idea of combining a photographic camera and a television pick-up tube to form a studio camera has been suggested. However, when several studio cameras of the type noted above are used, the television pick-up tubes may run continuously, and there are outputs applied to the transmitter by suitable switches. Thus a change from one pick-up tube to another can be brought about instantaneously. However, in order to conserve film, the photographic cameras operate only when the corresponding pick-up tube is connected to the transmitter. Due to the mechanical inertia of the photographic cameras, it takes them a while to come up to speed. Allowance must be made for this fact so that the film recording will conform exactly to the televised program.

It is therefore an object of this invention to provide an improved means for switching from one studio camera to another, so that the photographic recording in each studio camera coincides exactly with the images reproduced by the respective television pick-up tubes.

Briefly, this objective may be obtained by delaying the energization of the television pick-up tube until the camera associated with the pick-up tube has come up to speed. In this way, the photographic recording coincides precisely with the program as picked up by the television camera.

One of the ever present problems in making a photographic recording of a television program wherein one switches from one studio camera to another is splicing the photographic recordings appearing on the different cameras at the proper points. In previously known systems wherein a television pick-up camera is employed with a photographic recording camera, no means are provided for printing cueing signals or cueing indicia onto the various strips of film, so that they may be identified in the photographic processing room and spliced together in proper sequence.

Accordingly, it is another object of this invention to provide a means whereby cueing indicia is printed on the photographic recording of the television program so as to indicate the proper sequence of a particular strip of film with respect to the others.

Briefly, this objective is attained by exposing a portion of the film in each photographic recording camera and sound recorder to light from a counter mechanism. Each of the counter mechanisms is advanced upon each change from one studio camera to another. Therefore, when the film in any one camera is being advanced, it will be exposed to light from the counter and a number indicative of that particular film sequence will be printed on every frame of the film and in the ensuing sequence.

It is the customary practice today to record the sound portion of a television program separately from the photographic portion. Therefore, the film on which the sound recording is made must also be synchronized with each of the photographic recordings. In fact this synchronization must be exact in order that the sounds produced may coincide with the motion of the objects producing them. For example, if a pistol is fired, the shot should occur at the same time smoke emerges from the barrel of the gun. In making the sound recording, a plurality of microphones may be employed, any number being connected to the sound recorder at any given time. Thus, a single sound recording film may be produced. As this film generally runs continuously, it is apparent that during switching intervals from one studio camera to another that the sound film will continue whereas the photographic recording is momentarily interrupted. Such discrepancies are not of much importance in and of themselves, but their accumulated effect may be quite serious at the end of a half-hour program where many switches are made from one studio camera to another. For this reason it is necessary that indicia be marked on the sound recording film, or other synchronous recording media, so that the sound strip can be readily and properly aligned with the photographic recording.

The manner in which the above objectives will be achieved in accordance with the principles of this invention become more readily apparent from a consideration of the drawings in which.

Figure 1:
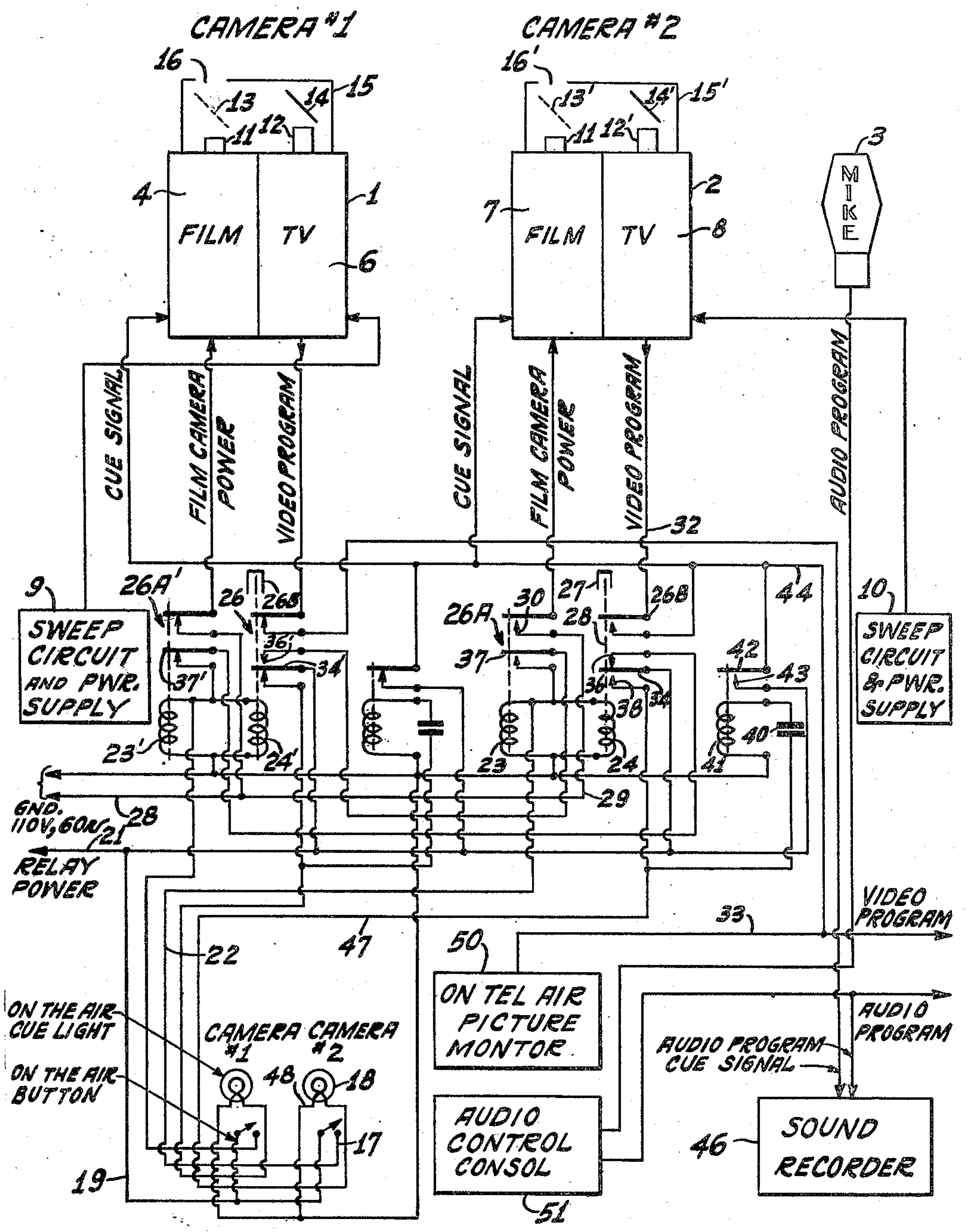
Figure 1 illustrates in schematic form one type of switching system that operates in accordance with the principles of this invention.

The overall system of film recording that is the subject of this invention is illustrated in Figure 1. The upper portion of the drawing includes a studio camera 1, a studio camera 2, and a microphone 3 that are usually found in the studio itself. The remaining equipment illustrated in the lower portion of the drawing is normally located in either the control room or the sound recording room as convenience dictates.

Studio camera 1 is comprised of a photographic camera 4 and a television pick-up tube 6. Similarly, the studio camera 2 is comprised of a photographic camera 7 and a television pick-up tube 8. Each of the pick-up tubes is provided with sweep voltages and electrode potentials from circuits included in the rectangles 9 and 10 respectively.

Images are provided to the lens 11 of the photographic camera 4 and the lens 12 of the television pick-up tube 6 via an image splitter comprised of a partially silvered mirror 13 and a fully silvered mirror 14 mounted with respect to the lenses 11 and 12 as shown. In order to prevent light from showing directly on the lenses, the mirror system is enclosed in a light-proof box 15 having an opening 16 therein that is opposite the partially silvered mirror 13. The mirrors 13 and 14 are parallel and form an angle of 45° with respect to the principal axes of their respective lenses 11 and 12. A similar arrangement is provided in the studio camera 2, corresponding parts being indicated by light numerals primed. In this way the images impressed upon the photographic cameras and the television pick-up tubes are identical as the image splitter has overcome any paralax that normally exists when two lens systems are mounted side by side.

Assume that the studio camera 1 is not active and that the director of the television program desires to switch to studio camera 2. He depresses the on-the-air button 17 that is associated with studio camera 2 and holds it down until the light 18 is illuminated. The sequence of operations thus set in motion is as follows. It will be seen that one side of the switch 17 is connected via a lead 19 to a source of relay power 21; that the other side of the switch 17 is connected to ground via a lead 22 to the upper side of parallel relay coils 23 and 24 that form a part of a switch generally indicated by the numeral 26A. The other side of the relay coils 23 and 24 are returned to ground. Therefore, the closing of the on-the-air switch 17 energizes both of the coils 23 and 24. The relay 26A is immediately pulled down but the relay 26B is not activated until it overcomes the action of a dash-pot 27 or other similar time delay relay.

Upon the closing of the relay 26A, electric power is supplied from a source 28 via lead 29 and the now closed contact 30 to the photographic camera 7. The mechanism in the camera then starts in operation and a frame or two of the film in the camera 7 is exposed.

After the switch 26B is actuated, the video signals provided by the television pick-up tube 8 on the lead 32 are connected to a video output bus 33 via relay contact 35. The amount of time delay in the one way dash-pot relay 27 may be adjusted to permit the film camera 7 to come up to speed before the television camera 8 is permitted to supply output signals to the television transmitter.

It will be seen that relay power is supplied to the contact arm 34 that is located between the switching contacts 36 and 38. In the position shown, that is in the position wherein camera 2 was not operating, the arm 34 is in contact with the switching contact 36, so that relay power flows to ground through the coils 23′ and 24′ via contact 37′ of the switch 26′A. This circuit connection therefore holds the relay 26′A in the position shown or, in other words, in the condition wherein the studio camera 1 is in operation. However, upon the actuation of the relay 26B, the switch arm 34 is brought into contact with the lower switch contact 38. This interrupts the holding current flowing through the relay coils 23′ and 24′ and therefore the relay 26′A and 26′B immediately become deenergized and revert to a position opposite to that shown.

Each of the film cameras 4 and 7 is supplied with a mechanism to be described later for recording cueing indicia on the film. In one example the means for providing this cueing indicia may be a counter, which is stepped forward one position for every operation of a ratchet arm. When the relay 26B is actuated and the switch arm 34 makes contact with the lower contact 38, the switching power is supplied to two places. First, it is supplied via a condenser 40, so as to close contacts 42 and 43 by energizing a relay coil 41. As soon as the condenser 40 becomes charged, the current ceases to flow and the switch contacts 42 and 43 are again open. However, the momentary pulse of voltage, thus applied to a cueing signal bus 44, is thus applied to each of the film cameras 4 and 7 as well as to the cueing circuits to be described in detail later in connection with the sound recorder 46.

Secondly, the actuation of the relay 26B and the closing of the control arm 34 onto the switch contact 38 also supplies relay power via a lead 47 through the indicating light 48 that is to indicate that the camera 2 is in action.

The relays 26A and 26B are held in a closed or energized position by the contact between the switch arm 34′ and the contact 36′ of the relay 26′B.

All the video signals formed by the cameras are supplied to an on-the-air picture monitor 50. All of the audio signals generated by the microphone 3 are passed through an audio control panel 51 before being applied to the sound recorder 46.

Figure 2:
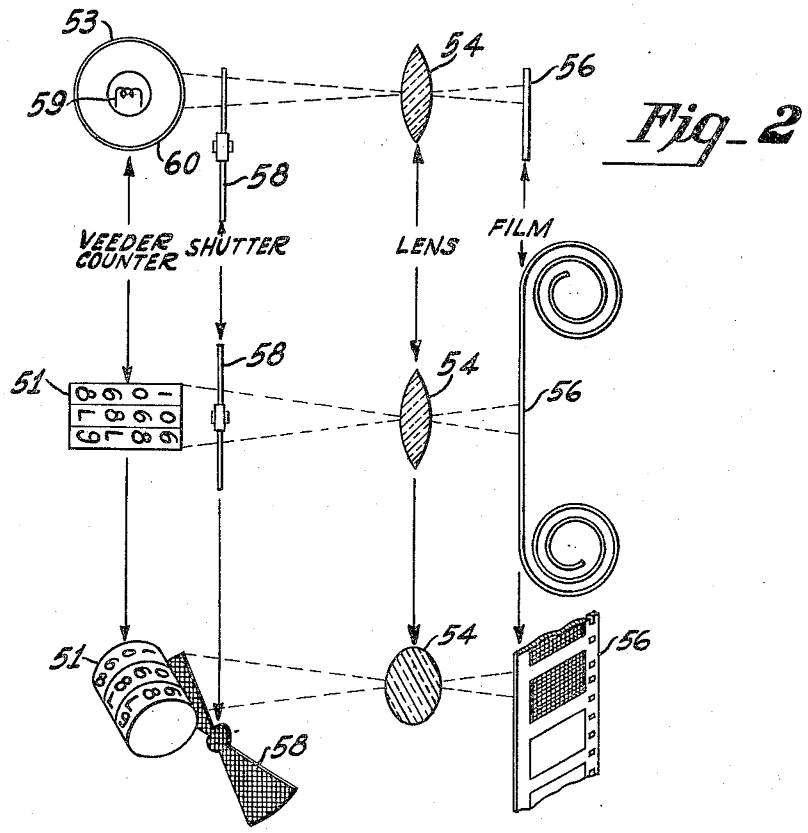
Figure 2 illustrates in schematic form how the cueing indicia are to be recorded on the sound film and on the photographic film in accordance with the principles of this invention.

Figure 2 is a schematic arrangement showing different views of the general manner in which cueing indicia may be imprinted on the edge of the photographic film. A side view of a veeder type counter 53 is shown in the upper portion of the drawing, a top view in the middle portion, and a projected view in the lower portion. A lens 54 is placed between the counter and the film 56 so as to focus the numbers appearing on the counter onto the edge of the film. Of course, it is possible that arrangements might be made to place these numbers in between frames on the film but preferably they are located on the side opposite the sprocket holes 57 or between sprocket holes. Between the counter 53 and the lens 54 is located a shutter 58, which is arranged to cut off the light coming from the counter when the film 56 is moving and thus prevent the numbers imprinted on the edge of the film from becoming blurred. Although it is possible to illuminate the counter externally, it is convenient to illuminate the counter from the inside with a lamp 59 and make the barrel 60 containing the numbers of the counter transparent. The numbers can be etched on the barrel 60 so as to be transparent or can be inked on so as to be opaque. This shutter 58 could be separate from that used in the picture recording section of the camera, but, as will be seen from a discussion of Figure 3, it is possible to use the main camera shutter.

Figure 3:
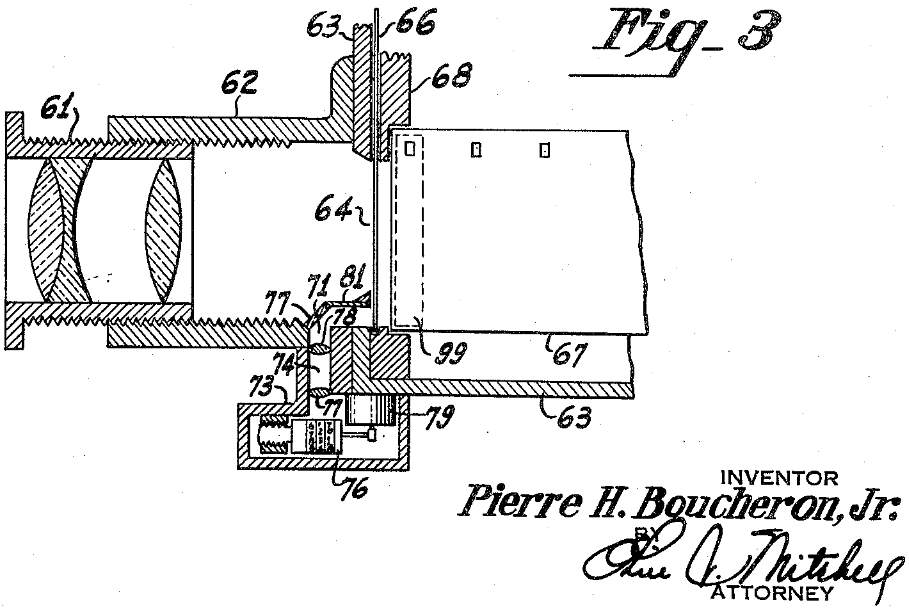
Figure 3 is a cross-sectional view of a portion of a photographic camera in which means are provided for recording cueing indicia on a portion of the film.

Figure 3 illustrates the details of one way in which the cueing indicia numbers may be imprinted on the edge of the film as discussed in connection with Figure 2. The structure described immediately below is well known to those skilled in the art and variations may exist therein without affecting the operation of this invention. They are described so as to give a proper setting for the invention. The lens system of the camera is contained within a lens barrel 61, which is threaded to the lens mount 62. The lens mount is secured in turn to the camera body 63 so that images projected by the lens system are passed through an opening 64 therein. Passage of light through this opening is controlled by a shutter 66. Film 67 is intermittently moved past the opening 64 in the gate 68 by a conventional camera intermittent mechanism. Film is held in the gate with a pressure pad 69 in the conventional manner.

In order to carry out one feature of this invention, however, a hole 71 is cut in the side of the lens mount 62 and a mirror 72 is placed at such an angle with respect to the axis of the hole 71 so as to direct light emerging from the hole onto the lower edge of the film 67. A canister 73 having an opening 74 therein is secured to the lens mount 62 in such fashion that the openings 74 and 71 coincide. A counter 76 of the type described above in connection with Figure 2 is mounted so that an image of the numbers on the counter may be projected by lenses 77 and 78 onto the mirror 72. The counter is tripped or actuated so as to advance one digit by a relay 79. In order to prevent light from the main lens system of the camera from impinging upon the edge of the film where the cueing indicia is to be printed, a shield 81 is placed between the mirror 72 and the shutter 66. It will be noted that the shutter 66 is of sufficient radius to extend between the lower edge of the film 67 and the light emerging from the mirror 72. In this way, a recording is made of the counter reading only when the film is stationary within the film gate 68.

Figure 4:
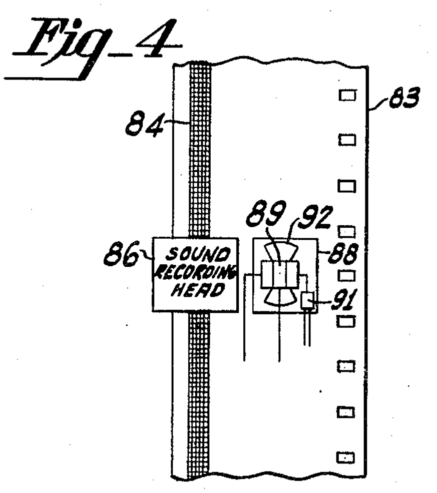
Figures 4 and 4A are two views of one arrangement that may be employed in the sound recording for printing the proper cueing indicia under the sound film.
Figure 4A:
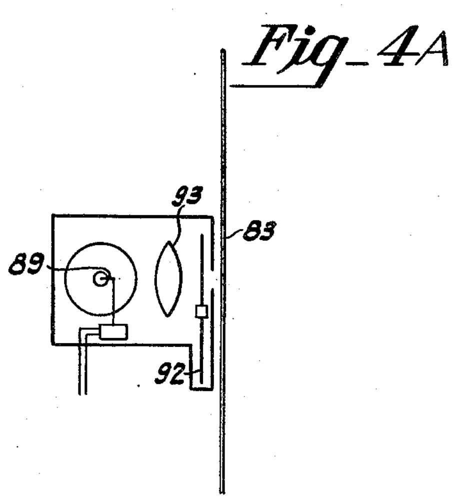

Figures 4 and 4A illustrate in further detail the sound recorder 46 of Figure 1. The sound film 83 having a sound track area 84 is continuously drawn past any standard type of sound recording head 86. Between the sound track area 84 and the sprocket holes 87 is located a means 88 for printing a cueing indicia onto the central portion of the film. This means may include a counter 89, an electro magnetic relay 91 for actuating and advancing the counter 89 and a shutter 92. As will be seen in the drawing 4A, the shutter 92 may be located between a lens system 93 and the film 83. Normally, the film 83 is moving continuously and therefore the action of the shutter 92 is such as to permit an image from the counter 89 to be projected onto the film 83 during such short intervals that no noticeable or objectionable blurring of the numerals will occur.

It is of course apparent that the shutter 92 could be excluded, if a triggered light were placed inside the counter 89. In such an arrangement the duration of each flash of light would be so short as to practically stop the motion of the film and could be actuated in response to or in synchronism with the motion of the film gates in the photographic cameras of Figure 1. It is preferable that arrangements be made for synchronizing the shutter 92 in such a way that an image of the counter appears on the sound film 83 at a point opposite each sprocket hole 87. It is believed that arrangements for accomplishing this are well known to those skilled in the art. For example, in a photographic camera, the shutter is obviously carefully synchronized with the motion of the film so that the frames are placed in the same position with respect to the sprocket holes. The only distinction here is that the open portion of the shutter 92 is smaller than that employed in the photographic cameras.

If, on the other hand, an intermittently flashing light is employed, the light can be triggered off in synchronism with the film gate 68 of Figure 3.

Figure 5:
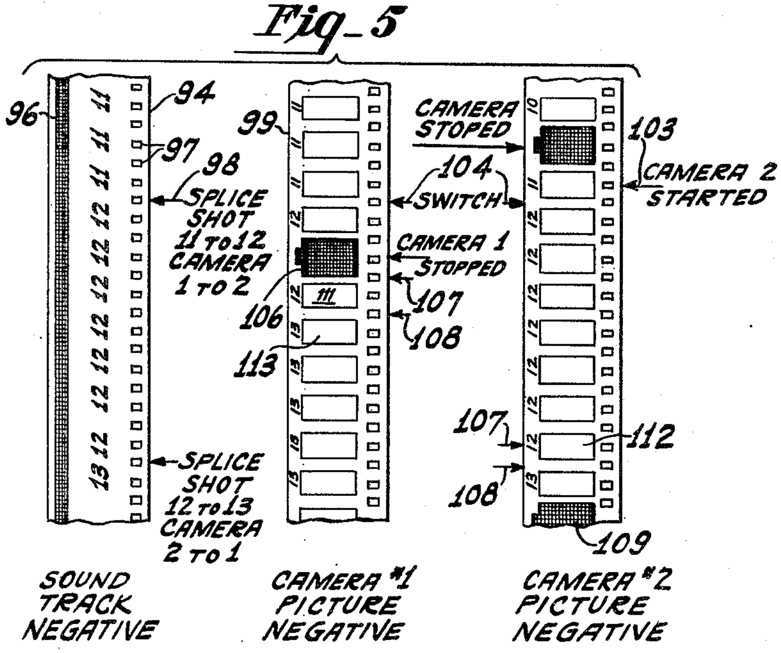
Figure 5 shows films on which the cueing indicia have been recorded after a switch from one studio camera to another.

Figure 5 illustrates typical examples of both sound and picture film that may be obtained through the use of the equipment described above. The sound is recorded on a film strip 94 in the sound track area 96 which in this particular instance is shown on the edge of the film opposite the sprocket holes 97.

As discussed above an image of the counter 89 is recorded on the film 94 opposite every sprocket hole 97. One number is employed per picture frame on 16 mm. film. On 35 mm. one per three sprocket holes is employed. Therefore, it will be noticed in the example shown that in the top section of the film the counter registered the numeral 11. It then changed to a numeral 12. As indicated by the arrow 98, the actual transfer from one camera to another takes place at the sprocket hole lying intermediate the numerals 11 and 12. Assume that film strip 99 is taken from camera 1 and that film strip 101 is taken from camera 2 and further that camera 1 is operating and it is desired to switch to camera 2. The film sequence 11 is being taken by camera 1 as indicated by the numeral in the lefthand edge of the film strip 99. During this time, the film in camera 2 is stationary and therefore a frame 102 that is within the gate becomes fogged as indicated. Assume now that the on-the-air button 17 of Figure 1 is closed so as to initiate the sequence of operations discussed in connection with that figure at a time indicated by an arrow 103. The actual switching operation from studio camera 1 to studio camera 2 does not take place in this illustrated example until the film has moved a distance lying between the single arrow 103 and the double arrows 104. It will be noted that at this point the camera 1 slows down and finally stops with a frame 106 in the gate. It will be further noticed that the film indicia is changed from 11 to 12 on the frame occurring immediately after the actual switching operation indicated by the double arrows 104. From that point on, numerals 12 are printed on the left-hand edge of the film. Suppose now that it is desired to switch back from camera 2 to camera 1. The operation of the camera 1 on-the-air switch takes place at a time indicated by an arrow 107, but, as before, the actual switch from one camera to another does not take place until sometime later as indicated by arrows 108. The first frame following the arrows 108 is numbered 13 on film strip 101 and the next frame 109 is fogged as the film in the camera 2 again comes to a rest position in the gate. Turning now to the film strip 99 that is in camera 1, the frame 111 is still indicated by a numeral 12 as it corresponds to the frame 112 of the film strip 101 in camera 2. However, by the time the arrow 108 is reached, the actual switching back to camera 1 is accomplished and the frame 113 is the first frame in the new sequence.

As noted above in connection with the discussion of Figures 1, 4, and 4A, the changing of the cueing indicia on the sound film 94 took place at precisely the same time as the actual switch from one camera to another. Therefore, in going from sequence 11 to sequence 12, the actual switching operation from camera 1 to camera 2 took place at a point indicated by the arrows 104. Therefore, it will be noted that the frame on the upper side of the arrow is numbered 11 and the frame on the lower side of the arrow is numbered 12. Similarly, the number on the sound film 94, that is above the arrow 98, is 11 and the number immediately below the arrow 98 is 12. Therefore, these arrows indicate the points where splicing should be accomplished. The fogged frame 102 and the frame immediately following it are cut out of the photographic record as they are not a true recording. In this way, the additional frames required for the cameras to come up to speed are drawn away and the photographic film and the sound film can be exactly synchronized. As was pointed out previously, the error due to leaving in one of these extra frames in the photographic film would not amount to much, but the accumulated error after several switching actions from one studio camera to another would become highly objectionable.

Figure 6:
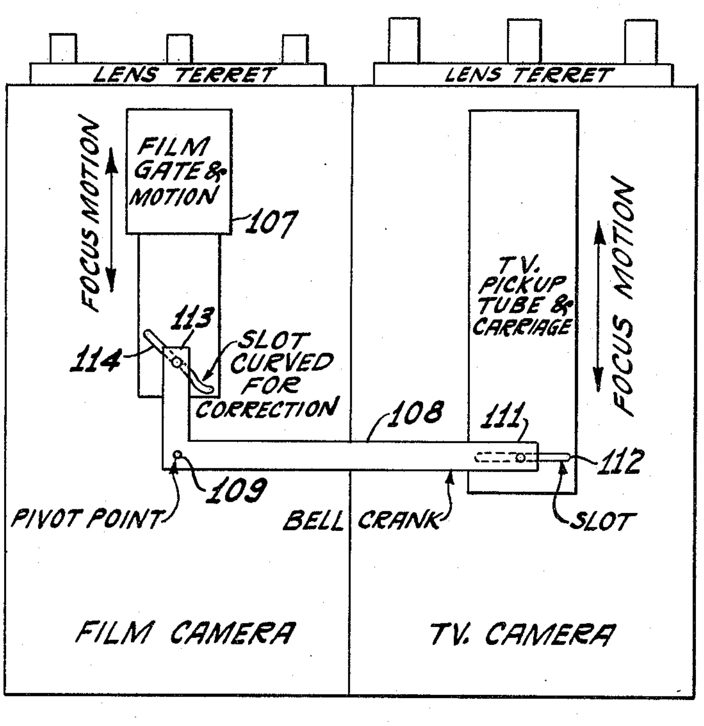
Figure 6 illustrates apparatus for achieving proper focus of the photographic optical system and the television pick-up tubes optical system.
Figure 7:
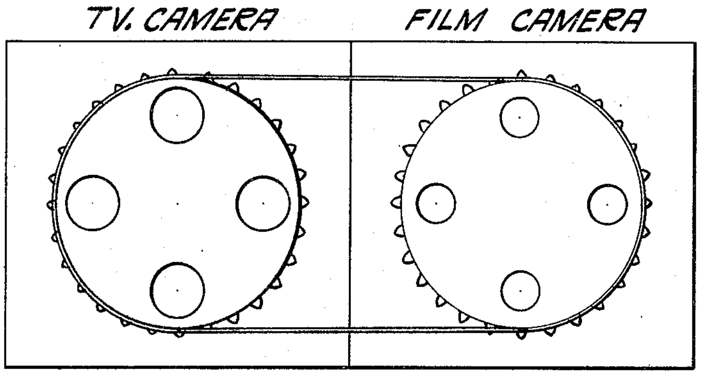
Figure 7 illustrates the mechanism for operating the turret lenses of a photographic camera and a television program in synchronism.

Figure 6 illustrates the manner in which a photographic recording camera and a television pick-up tube may be combined to form a studio camera. Instead of having single lenses, as shown in Figure 1, a lens turret can be mounted on the front of the film camera and the television pick-up tube. The synchronous operation of these lens turrets can be obtained by placing sprockets in the usual periphery of the turret and connecting them with a chain as shown in Figure 7. If each of the corresponding lenses in the turret had the same focal length, the motion of the film and the sensitive target of the pick-up tube with respect to the lens would be uniform. Normally, the focal lengths of the desired lenses will not be the same and, therefore, in focusing the image on the film of the photographic camera and onto the sensitive target of the television pick-up tube a relative motion must be imparted between the film camera and the pick-up tube. The film camera 107 may be restricted to motion along the principal axis of the particular lens that is in position. Similarly, the television pick-up tube is restricted to longitudinal motion along the principal axis of a lens that is in position. If a bell crank 108 is pivoted at a point 109 lying in the principal axis of the film camera, an end 111 of one arm of the bell crank 108 is restricted to move in a slot 112 that is perpendicular to the longitudinal axis of the television pick-up tube. The end 113 of the other arm of the bell crank 108 is restricted to light in a curve slot 114 that is diagonal to the principal axis of the film camera 107. In this way, depending upon the angle that the slot 114 makes with the principal axis of the film camera 107 and also upon the relative lengths of the arms of the bell crank, the film camera is moved forward and back with respect to the lens turret by a less amount than is the television pick-up tube. If the relation between the focal lengths of the corresponding lenses on a lens turret are constant, perfect tracking may be achieved by an arrangement as just described. If only one pair of lenses with different focal lengths were used, the linkage just described could be made to give perfect tracking so as to keep the image in proper focus. When different pairs of lenses have differently related focal lengths, satisfactory tracking can be obtained by suitably curving one or both of the slots 111 and 114. When, however, the turrets carry more than one pair of corresponding lenses, each having different focal lengths, a compromise must be reached between the tracking curves of the different pairs of lenses. This, however, is not a serious consideration as the depth of the field of the lenses will cover some of the error. The foregoing lens focusing may be accomplished by other means obvious to those skilled in the art, servo-mechanisms etc.

Having thus described my invention, what is claimed is:

1. Apparatus for making a photographic recording of television programs comprising in combination a plurality of studio cameras, each of said studio cameras comprising in combination a photographic camera and a television pick-up tube, switching apparatus adapted to automatically set one photographic camera in operation and the other photographic camera out of operation, a video signal output bus, automatic switching means responsive to said switching apparatus for connecting the video signal output of the corresponding television pick-up tube to said output bus at a time subsequent to the start of operation of said photographic camera, a projector adapted to project an image of a cueing indicia onto a normally unexposed portion of the photographic film in said photographic camera, and switching means for changing the cueing indicia each time the output of the television pickup is connected to the video signal output bus.

2. Apparatus for making a photographic record of a television program comprising in combination a plurality of studio cameras, each of said studio cameras comprising a photographic camera and a television pick-up tube, automatic switching apparatus for selectively rendering one said photographic camera and its associated television pick-up tube operative at successive intervals of time so that the photographic camera is up to normal speed when the video signals from said pick-up tube are applied to a common video output bus.

3. Apparatus as described in claim 2 in which said switching apparatus automatically renders inoperative all the photographic cameras and television pick-up tubes except those selected.

4. Apparatus for optically and acoustically recording a television program comprising in combination, a studio camera comprised of a photographic camera and a television pick-up tube, said photographic camera being equipped with means for recording cueing indicia onto each frame of the picture film in said photographic camera, a sound recorder adapted to record sound on a sound film, said sound recorder being equipped with means for recording cueing indicia onto said sound film at the same time it is recorded on the picture film, a television pickup tube switching means for automatically selecting video signals from said tube and responsive to camera normal speed.

5. Apparatus as described in claim 4 in which means are provided for changing said indicia when said television pick-up tube is urged from an inoperative to an operative position.

6. A studio camera comprising in combination a photographic camera and a television pick-up tube, a first switch for energizing said photographic camera, a second switch adapted to operate after said first switch, said second switch being connected so as to conduct the video signals developed by said television pick-up tube to an output bus, a counter, means for illumination of said counter and an optical means for projecting light from said counter onto the film in said photographic camera, a relay attached so as to advance said counter in response to the operation of said second switch.

References Cited in the file of this patent

UNITED STATES PATENTS

| Number | Name | Date |
|---|---|---|
| 2,081,730 | Bererage | May 25, 1937 |
| 2,208,404 | Aalberg | July 16, 1940 |
| 2,303,181 | Thomas | Nov. 24, 1942 |
| 2,308,441 | Dalgleish | Jan. 12, 1943 |
| 2,420,197 | Rosenthal | May 6, 1947 |
| 2,531,497 | Beatty | Nov. 28, 1950 |
| 2,538,910 | Miller | Jan. 23, 1951 |
| 2,615,088 | Gordon | Oct. 21, 1952 |